(12) United States Patent
Wu et al.

(10) Patent No.: US 12,266,899 B2
(45) Date of Patent: Apr. 1, 2025

(54) FIBER, OPTICAL AMPLIFIER, AND OPTICAL COMMUNICATIONS SYSTEM

(71) Applicant: Huawei Technologies Co., Ltd., Shenzhen (CN)

(72) Inventors: Bo Wu, Chengdu (CN); Kai Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 17/962,068

(22) Filed: Oct. 7, 2022

(65) Prior Publication Data
US 2023/0022687 A1 Jan. 26, 2023

Related U.S. Application Data

(63) Continuation of application No. PCT/CN2021/083637, filed on Mar. 29, 2021.

(30) Foreign Application Priority Data

Apr. 8, 2020 (CN) .......................... 202010277671.8

(51) Int. Cl.
 *H01S 3/067* (2006.01)
 *H01S 3/094* (2006.01)
 *H04B 10/25* (2013.01)

(52) U.S. Cl.
 CPC ........ *H01S 3/0675* (2013.01); *H01S 3/06716* (2013.01); *H01S 3/094003* (2013.01); *H04B 10/25* (2013.01)

(58) Field of Classification Search
 CPC ... H04B 10/25; H01S 3/0675; H01S 3/06716; H01S 3/094
 (Continued)

(56) References Cited

U.S. PATENT DOCUMENTS

| | | | |
|---|---|---|---|
| 5,271,024 | A | 12/1993 | Huber |
| 5,703,978 | A | 12/1997 | DiGiovanni et al. |

(Continued)

FOREIGN PATENT DOCUMENTS

| | | |
|---|---|---|
| CN | 1246182 A | 3/2000 |
| CN | 1266995 A | 9/2000 |

(Continued)

OTHER PUBLICATIONS

Jain et al; Spectral and Dispersion Properties of Long Period Fiber Grating for Optical Communication Systems; Sep. 2018; Advanced Electromagnetics, vol. 7, No. 4; pp. 1-8. (Year: 2018).*

*Primary Examiner* — Amritbir K Sandhu
(74) *Attorney, Agent, or Firm* — Conley Rose, P.C.

(57) ABSTRACT

A fiber applied to an optical amplifier, where the fiber includes a rare earth-doped core and a cladding. The core includes a gain equalization unit. The core is configured to separately amplify optical signals of all wavelengths in a received multiplexing wave. The gain equalization unit is configured to equalize gains of the optical signals of all the wavelengths, such that gains of optical signals that are of all the wavelengths and that are transmitted from an egress port of the fiber all fall within a preset range. The gain of the optical signal of each wavelength in the optical signals of all the wavelengths is determined based on a ratio of power of an amplified optical signal to power of the unamplified optical signal.

20 Claims, 9 Drawing Sheets

(58) Field of Classification Search
USPC .......................................................... 398/141
See application file for complete search history.

(56) References Cited

U.S. PATENT DOCUMENTS

| | | | | |
|---|---|---|---|---|
| 6,392,789 | B1 * | 5/2002 | Paek | G02B 6/02147 |
| | | | | 359/341.1 |
| 6,490,078 | B2 * | 12/2002 | Enomoto | H01S 3/06708 |
| | | | | 359/341.1 |
| 2001/0036335 | A1 | 11/2001 | Tsuda et al. | |
| 2005/0248834 | A1 * | 11/2005 | Onaka | H01S 3/094003 |
| | | | | 359/341.1 |

FOREIGN PATENT DOCUMENTS

| | | | | |
|---|---|---|---|---|
| EP | 1116971 | A1 * | 7/2001 | G02B 6/02095 |
| EP | 1150403 | A1 * | 10/2001 | H01S 3/10023 |
| JP | 2016167489 | A | 9/2016 | |
| KR | 20030083212 | A | 10/2003 | |
| WO | 9918476 | A1 | 4/1999 | |
| WO | 0036714 | A1 | 6/2000 | |

* cited by examiner

FIBER, OPTICAL AMPLIFIER, AND OPTICAL COMMUNICATIONS SYSTEM

CROSS-REFERENCE TO RELATED APPLICATIONS

This is a continuation of International Patent Application No. PCT/CN2021/083637, filed on Mar. 29, 2021, which claims priority to Chinese Patent Application No. 202010277671.8, filed on Apr. 8, 2020. The disclosures of the aforementioned applications are hereby incorporated by reference in their entireties.

TECHNICAL FIELD

This application relates to the field of fiber technologies, and in particular, to a fiber, an optical amplifier, and an optical communications system.

BACKGROUND

With development of communications technologies, traffic in a communications system increases explosively. Therefore, a higher requirement is imposed for a spectral width and noise of the communications system. Using a wavelength-division multiplexing (WDM) optical communications system as an example, in the WDM optical communications system, a bottleneck is encountered in improving single-wavelength spectral efficiency of a C band, and expansion to a band outside the C band is started. Because an attenuation coefficient of an L band in a fiber is relatively low, the L band becomes a preferred band for expansion.

In the WDM optical communications system, an erbium-doped fiber amplifier (EDTA) is a relatively important component. Because the EDFA has different saturation features for optical signals of different wavelengths, the EDFA generates different gains for optical signals of all wavelengths in the WDM optical communications system. As a result, some channels have severe bit error rates, and performance of the entire WDM optical communications system degrades.

To ensure that a gain of an amplified optical signal output by the EDFA is flat, a component such as a gain flattening filter (GFF) is usually added to the EDFA. However, because the component such as the GFF has an insertion loss (IL), the IL may cause relatively high noise of the EDFA. In particular, when a relatively large quantity of GFFs need to be concatenated, noise of the EDFA increases significantly.

SUMMARY

This application provides a fiber, an optical amplifier, and an optical communications system, to flatten a gain of an optical amplifier without increasing noise of the optical amplifier.

According to a first aspect, this application provides a fiber, and the fiber may be applied to an optical amplifier. The fiber includes a rare earth-doped core and a cladding that are sequentially distributed from the inside to the outside, where a refractive index of the cladding is less than a refractive index of the rare earth-doped core, and where the rare earth-doped core includes a gain equalization unit. The rare earth-doped core is configured to separately amplify optical signals of all wavelengths in a received multiplexing wave. The gain equalization unit is configured to equalize gains of the optical signals of all the wavelengths, such that gains of optical signals that are of all the wavelengths and that are transmitted from an egress port of the fiber all fall within a preset range. The gain of the optical signal of each wavelength in the optical signals of all the wavelengths is determined based on a ratio of power of an amplified optical signal to power of the unamplified optical signal.

Based on the solution, the rare earth-doped core may separately amplify optical signals of all wavelengths. When amplified optical signals pass through the gain equalization unit, the gain equalization unit may equalize (or referred to as flatten) gains of the optical signals of all the wavelengths. In this way, no new component needs to be introduced into the optical amplifier using the fiber, to equalize gains of optical signals of all wavelengths, such that gain equalization can be implemented without increasing noise.

To further reduce noise of the optical amplifier using the fiber, a start location of the gain equalization unit on the rare earth-doped core needs to be controlled. In a possible implementation, the start location of the gain equalization unit on the rare earth-doped core is determined based on an absorption coefficient and a preset total absorption amount that correspond to a maximum absorption peak in an absorption spectrum of the rare earth-doped core.

In a possible implementation, the gain equalization unit may be configured to perform, based on a total attenuation function of the fiber, energy attenuation on an optical signal corresponding to a gain that is greater than a threshold in the gains of the optical signals of all the wavelengths.

To prevent light from being reflected to a region before the start location of the core, the gain equalization unit is configured to radiate attenuated energy to a direction of the cladding.

In a possible implementation, the gain equalization unit may include M long period fiber gratings, where M is an integer greater than or equal to 1. When M is greater than 1, the M long period fiber gratings are dispersedly distributed on the rare earth-doped core from the start location. This helps further reduce noise of the optical amplifier. In addition, if light is bent, dispersed distribution helps dispose the gain equalization unit in a non-bent part.

Further, an attenuation function of each of the M long period fiber gratings is the same as the total attenuation function of the fiber, and a sum of attenuation amplitudes of the M long period fiber gratings is equal to an amplitude of the total attenuation function. The total attenuation function may be equivalently and evenly divided into NI parts using the NI long period fiber gratings, and the M parts are dispersedly distributed in a specific length of the rare earth-doped core, to dispersedly flatten a gain of the optical amplifier using the fiber.

In a possible implementation, an attenuation amplitude of each long period fiber grating is equal to the amplitude of the total attenuation function/M.

In a possible implementation, the long period fiber grating may be an inclined grating.

According to a second aspect, this application provides an optical amplifier. The optical amplifier may include at least one stage of amplification structure, and the at least one stage of amplification structure may include any fiber in the first aspect or the possible implementation of the first aspect, a multiplexer, a first optical selector, a pump source, or a second optical selector. The first optical selector is configured to receive optical signals of all wavelengths, and transmit the optical signals of all the wavelengths to the multiplexer. The pump source is configured to emit pumped light to the multiplexer. The multiplexer is configured to combine the pumped light and the optical signals of all the wavelengths into one multiplexing wave, and couple the multiplexing wave to the fiber. The second optical selector is configured to output amplified and gain-equalized optical signals that are of all the wavelengths and that are from the fiber.

Based on the optical amplifier, the rare earth-doped core may separately amplify optical signals of all wavelengths. When amplified optical signals pass through a gain equalization unit, the gain equalization unit may equalize (also referred to as flatten) gains of the optical signals of all the wavelengths. In this way, no new component needs to be introduced into the optical amplifier to equalize gains of optical signals of all wavelengths, such that gain eq alization can be implemented without increasing noise.

In a possible implementation, the first optical selector and the second optical selector are further configured to isolate reverse propagation of the amplified optical signals.

According to a third aspect, this application provides an optical communications system. The optical communications system may include any optical amplifier in the second aspect or the possible implementation of the second aspect, a transmitter, and a receiver. The transmitter is configured to transmit optical signals of all wavelengths to the optical amplifier. The receiver is configured to receive, from the optical amplifier, amplified and gain-equalized optical signals of all the wavelengths; and convert, into electrical signals, the amplified and gain-equalized optical signals of all the wavelengths.

For technical effects that can be achieved in the third aspect, refer to descriptions of beneficial effects in the second aspect. Details are not described herein again.

DESCRIPTION OF EMBODIMENTS

In the following descriptions, some terms in this application are described, to help a person skilled in the art has a better understanding.

I. Erbium Doped Fiber Amplifier (EDFA)

Figure 1A:
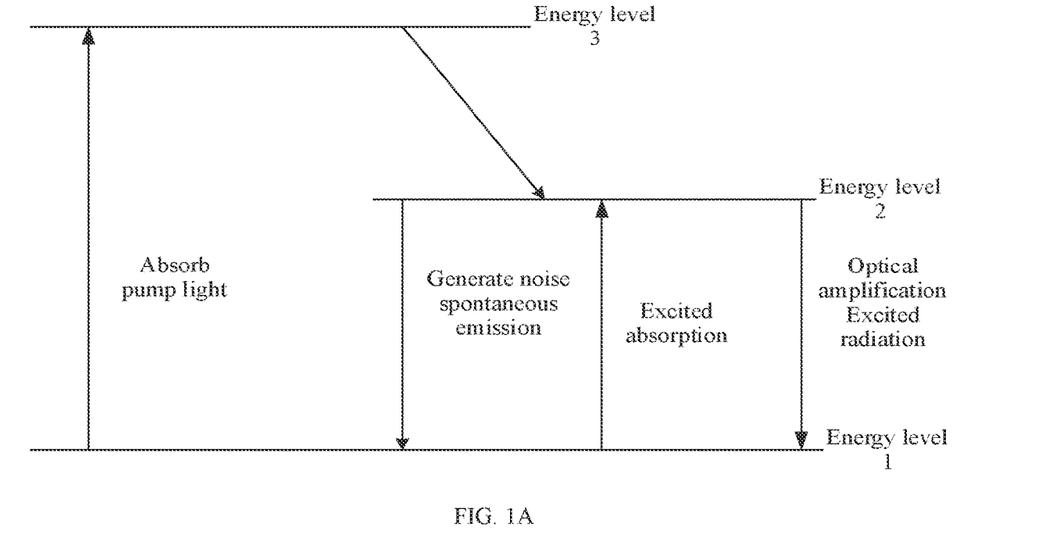
FIG. 1A is a simplified schematic diagram of an energy level of an erbium ion according to this application.

A working principle of the EDFA is to convert energy of pumped light into energy of an optical signal. An example process is as follows: In an erbium doped fiber (EDF), an erbium ion has three energy levels. FIG. 1A illustrates a simplified schematic diagram of an energy level of an erbium ion. An energy level 1 represents a ground state with lowest energy, an energy level 2 represents a metastable state and is an intermediate energy level, and an energy level 3 represents an excited state with highest energy. When photon energy of the pumped light is equal to an energy difference between the energy level 3 and the energy level 1, the erbium ion absorbs the pumped light to make a transition from the ground state to the excited state. Because the excited state is unstable, the erbium ion quickly returns to the energy level 2. If energy of an input optical signal is equal to an energy difference between the energy level 2 and the energy level 1, the erbium ion at the energy level 2 makes a transition to the ground state to generate excited radiated light, such that the optical signal is amplified. In other words, the optical signal is amplified because energy, of the pumped light is converted into energy of the optical signal. Therefore, to improve a gain of the EDFA, absorption of the pumped light can be improved, such that an erbium ion in the ground state makes a transition to the excited state as far as possible.

II. Gain Flattening

A gain of an optical amplifier represents an amplification capability of the optical amplifier. For example, the optical amplifier is an EDFA. Output power of the EDFA does not always increase in proportion to input power but tends to be saturated. A saturated output feature of the EDFA is related to a wavelength of an optical signal. The optical amplifier expects to obtain a high gain in a wide frequency band, and a gain spectrum of the EDFA is relatively wide, which can reach 45 nm, that is, the EDFA generates different gains for optical signals of different wavelengths. This gain change causes unbalanced power of all transmission channels. Therefore, gain equalization, also referred to as gain flattening, needs to be performed on optical signals of all wavelengths.

Figure 1B:
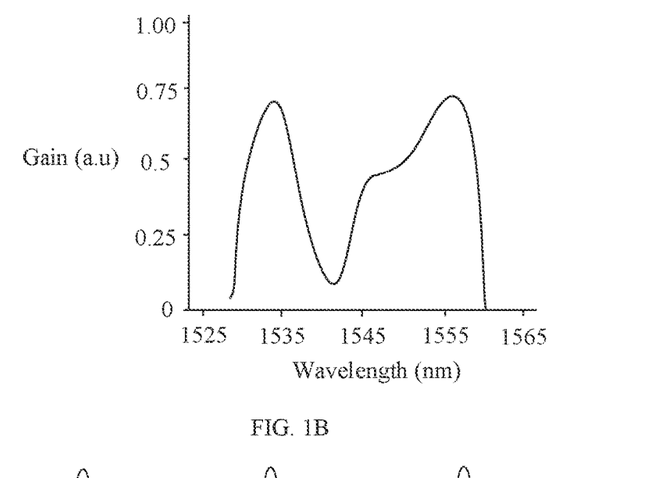
FIG. 1B is a schematic diagram of an intrinsic gain spectrum of an EDFA according to this application.

Gain flattening means that gains of optical signals that are of all wavelengths and that are amplified by the optical amplifier are the same or similar, that is, a gain spectrum is flat. In this way, a same gain can be provided to all channels that need to be amplified. FIG. 1B is a schematic diagram of a gain spectrum of an EDFA according to this application. The gain spectrum has a gain peak near both 1530 nanometers (nm) and 1555 nm. The gain peak near 1530 nm is relatively, sharp, and a spectral width is about 5 nm. The gain peak near 1555 nm is relatively flat, and a spectral width is about 15 nm to 20 nm. Gain flattening for the EDFA is mainly to reduce the two gain peaks.

III. Gain Flattening Filter (GFF)

The OFF is also referred to as a gain equalization filter, and is configured to flatten or smooth different gains in a specified wavelength range. Generally, the GFF is used together with an optical amplifier to ensure that all amplified optical signals have a same gain. A loss feature curve (or referred to as an attenuation function) of a corresponding OFF may be determined based on a gain spectrum of an optical amplifier and a loss spectrum of a fiber, to finally select a OFF that meets a requirement and place the OFF in a corresponding optical amplifier.

Figure 1C:
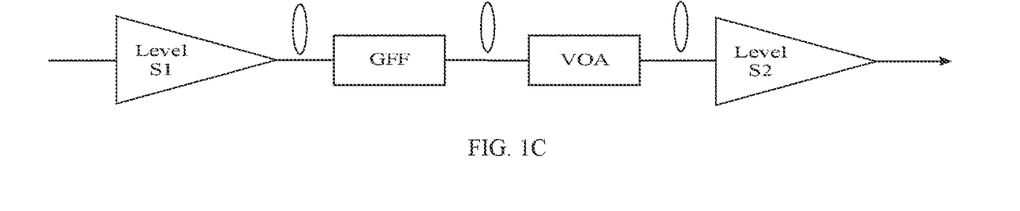
FIG. 1C is a schematic diagram of a structure of an EDFA in the conventional technology.

FIG. 1C is a schematic diagram in which a passive filter is inserted into an EDFA. The EDFA may include two or more stages of amplification structures, FIG. 1C shows an example in which the passive filter inserted into the EDFA is a OFF, and the EDFA includes an S1 amplification structure, the GFF, and an S2 amplification structure. The S1 amplification structure and the GFF may be connected using a fiber, and the OFF and the S2 amplification structure may also be connected using a fiber. The EDFA works in a relatively wide dynamic gain interval, for example, from 19 decibels (dB) to 25 dB or from 20 dB to 32 dB. Therefore, to ensure that gains of amplified optical signals output by the EDFA are flat, the OFF is usually added to equalize gains of optical signals of all wavelengths. Further, to more finely adjust a gain, a variable power attenuator (e.g., a variable optical attenuator VOA)) may be concatenated after the GFF, and the OFF and the VOA may also be connected using a fiber.

Figure 1D:
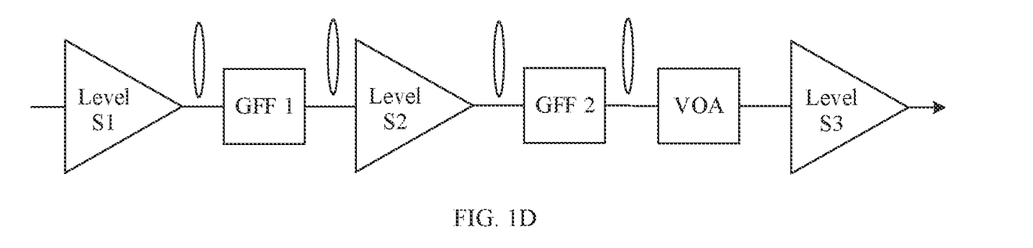
FIG. 1D is a schematic diagram of a structure of another EDFA in the conventional technology.

Further, because saturated output optical power of the optical amplifier is limited, a requirement still cannot be met after optical power output after an optical signal passes through the two stages of amplification structures is close to saturation. Therefore, a plurality of stages of amplification structures need to be concatenated to meet an optical power amplification requirement. In this case, to take noise of the optical amplifier into consideration, an attenuation value of a centralized GFF with a relatively large attenuation value is usually dispersed between a plurality of stages of amplification structures in the EDFA, that is, a total attenuation value of the OFF is split into an attenuation value of a OFF 1 and an attenuation value of a OFF 2. In other words, the GFF 1 and the GFF UT 2 are inserted into the EDFA. Referring to FIG. 1D, a sum of the attenuation value of the GFF 1 and the attenuation value of the OFF 2 is approximately equal to the total attenuation value of the GFF.

IV. Insertion Loss

The insertion loss is a loss of load power caused by insertion of some components at a specific location in a transmission system. To be more specific, the insertion loss indicates a ratio, in units of decibels, of power received on a load before insertion of some components to power received on the same load after insertion of the components. With reference to FIG. 1C and FIG. 1D, a loss caused after the GFF is inserted into the EDFA is the insertion loss.

V. Wavelength-Division Multiplexing (WDM)

Wavelength division multiplexing is a technology in which two or more optical carrier signals (carrying various types of information) of different wavelengths are converged together at a transmit end using a multiplexer, and are coupled to a same fiber of an optical line for transmission. At a receive end, optical carriers of various wavelengths are separated using a demultiplexer, and then an optical receiver performs further processing to recover an original signal. The technology in which two or more optical signals of different wavelengths are simultaneously transmitted in a same fiber is referred to as wavelength division multiplexing.

The foregoing describes explanations of some terms in this application, and the following describes technical features in this application.

Performance of an optical amplifier needs to consider not only a gain of an output optical signal, but also impact of noise of the optical amplifier on performance. For ease of solution description, the following is described using an example in which the optical amplifier is an EDFA.

Currently, a gain of the EDFA is usually flattened in the following two manners. In a first manner, an intrinsic gain spectrum of an EDF is optimized. For example, the EDF is doped with other impurities such as aluminum; for another example, a host matrix of the EDF is changed; for another example, a structure parameter of the EDF such as a width of a cladding or a width of a core is changed; or for another example, an optical parameter of the EDF such as a refractive index of a cladding or a refractive index of a core is changed. In a second manner, a component such as a GFF configured to implement gain flattening is inserted into the EDFA. For a structure and a gain equalization principle based on the second manner, refer to the foregoing description in FIG. 1C or FIG. 1D. Details are not described herein again.

The EDFA corresponds to an in each gain value, and $$NF = 10 \log_{10} \frac{\text{output signal-to-noise ratio}}{\text{input signal-to-noise ratio}}.$$

An NF of the EDFA is relatively good in a C band, and is usually 3.5 dB to 5 dB, Performance of an NF of the EDFA in an L band is worse than that of the NF in the C band, and is deteriorated by 1 dB to 3 dB. To ensure that optical signals in the C band and the L band can be transmitted to a target without any difference, noise of the EDFA in the L band needs to be reduced.

For FIG. 1C, noise of the EDFA in the L band may be represented using the following formula 1. For FIG. 1D, noise of the EDFA in the L band may be represented using the following formula 2.

$$NF_{Total} = NF_1 + [L_{12} * NF_2 - 1]/G_1 \qquad \text{Formula 1}$$

$$NF_{Total} = NF_1 + [L_{12} * NF_2 - 1]/G_1 + [L_{23} * NF_3 - 1]/G_2 \qquad \text{Formula 2}$$

$L_{12}$ represents an insertion loss of a component between the S1 amplification structure and the S2 amplification structure. With reference to FIG. 1C, $L_{12}$ represents insertion losses of a GFF, a VOA, an ISO, and a WDM that are inserted into the EDFA. With reference to FIG. 1D, $L_{12}$ represents insertion losses of the GFF 1, and an ISO and a WDM that are in the S1 amplification structure. $L_{23}$ represents an insertion loss of a component between the S2 amplification structure and the S3 amplification structure. With reference to FIG. 1D, $L_{23}$ represents insertion losses of the GFF 2 and a VOA, and an ISO and a WDM that are in the S2 amplification structure. $NF_1$ represents a noise figure of the S1 amplification structure, NP represents a noise figure of the S2 amplification structure, and $NF_3$ represents a noise figure of the S3 amplification structure. $G_1$ represents a gain of the S1 amplification structure, and $G_2$ represents a gain of the S2 amplification structure. It should be understood that $NF_1$, $NF_2$, $NF_3$, $G_1$, and $G_2$ usually depend on quality of an EDF.

Figure 2A:
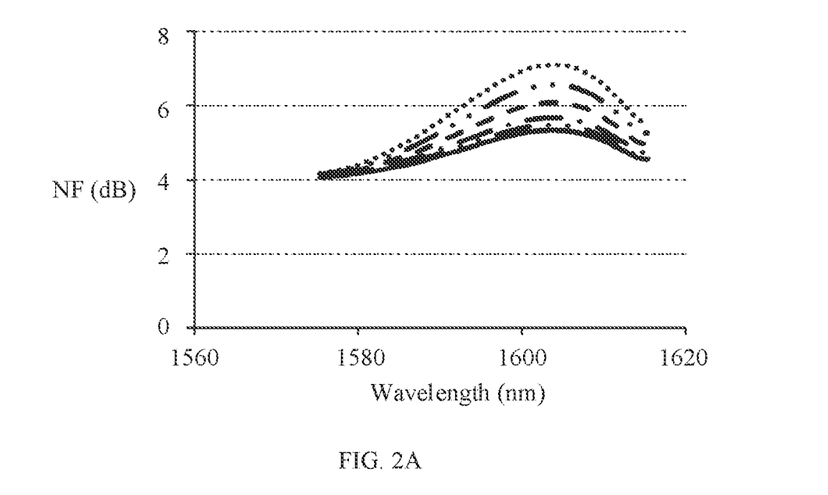
FIG. 2A is a schematic diagram of noise figure (NE) curves of a working EDFA in an L band in different gains according to this application.
Figure 2B:
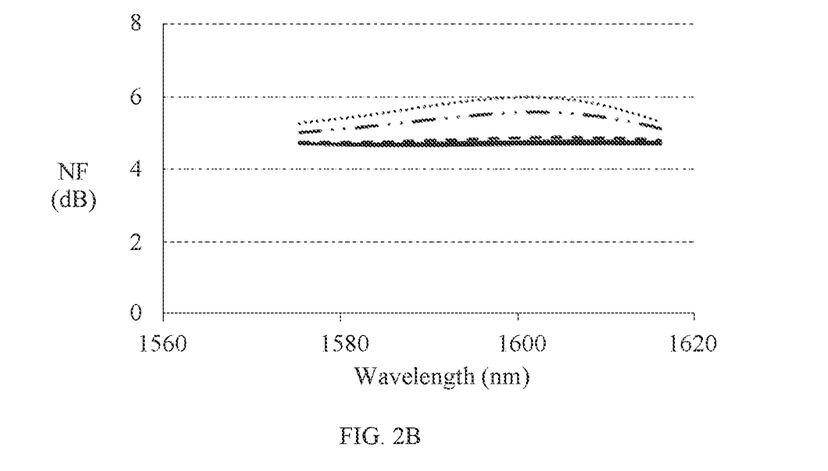
FIG. 2B is a schematic diagram of NF curves of another working EDFA in an L band in different gains according to this application.

Based on FIG. 1C, FIG. 2A illustrates a schematic diagram of NF curves of an EDFA in an L band in different gains. Based on FIG. 1D, FIG. 2B illustrates NE curves of an EDFA in an L band in different gains. It may be learned from FIG. 2A that when a gain change interval ranges from 19 dB to 25 dB, an NF value of an EDFA using two stages of amplification structures is changed by 2.7 dB. It may be learned from FIG. 2B that when a gain change interval ranges from 19 dB to 25 dB, the NF value is changed by 1.7 dB when three stages of amplification structures are used and a total loss value of a GFF is dispersed to form a loss value of a GFF 1 and a loss value of a GFF 2. Therefore, it may be learned that fluctuation of the NF value of the EDFA that disperses the total loss value becomes smaller in an entire gain interval.

It may be learned from the foregoing content that the gain of the EDFA is flattened in the first manner and the second manner. However, because the first manner is to change a material of the EDF, a new EDF needs to be manufactured again, which is relatively complex to implement. In the second manner, a WDM and an ISO need to be introduced each time a GFF is added, and the GFF, the WDM, and the ISO all have insertion losses. As a quantity of amplification stages increases, more ISOs and WDMs need to be introduced. For example, one ISO and one WDM have an insertion loss of 1.5 dB. When a total loss value of the GFF is dispersed in five stages of amplification structures, an insertion loss of 7.5 dB is introduced. The insertion loss is additionally introduced loss for an optical signal whose wavelength has a loss value of 0 in an attenuation function of the GFF, which increases total noise of the EDFA. To make noise of the EDFA relatively low, a relatively large quantity of amplification structures cannot be concatenated. In other words, a relatively large quantity of stages of amplification structures cannot be concatenated in the gain equalization manner in the second manner. If a relatively large quantity of amplification structures are concatenated, noise of the optical amplifier is relatively large.

To resolve the foregoing problem, this application provides a fiber. In the fiber, a gain equalization unit is disposed on a rare earth-doped core. When the fiber is applied to an optical amplifier, the optical amplifier may equalize gains of optical signals of all wavelengths using a gain equalization technology, and noise of the optical amplifier may not be increased. The gain equalization technology is using the gain equalization unit whose feature is opposite to a gain of the optical amplifier to offset unevenness between gains. For example, the gain equalization unit whose feature is opposite to a gain spectrum of an EDFA flattens the gain spectrum of the EDFA.

Based on the foregoing content, the fiber provided in this application is described below with reference to FIG. 3 to FIG. 12.

Figure 3:
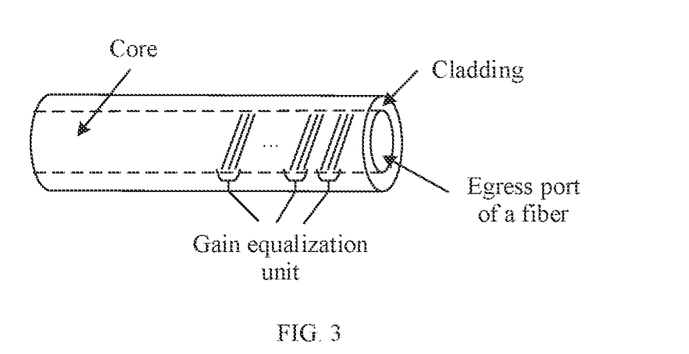
FIG. 3 is a schematic diagram of a structure of a fiber according to this application.

FIG. 3 is a schematic diagram of a structure of a fiber according to this application. The fiber may be applied to an optical amplifier, and the fiber includes a rare earth-doped core and a cladding that are sequentially distributed from the inside to the outside A refractive index of the cladding is less than a refractive index of the rare earth-doped core, and the rare earth-doped core includes a gain equalization unit. The rare earth-doped core is configured to separately amplify optical signals of all wavelengths in a received multiplexing wave. The gain equalization unit is configured to equalize gains of the optical signals of all the wavelengths, such that gains of optical signals that are of all the wavelengths and that are transmitted from an egress port of the fiber all fall within a preset range. The gain of the optical signal of each wavelength in the optical signals of all the wavelengths is determined based on a ratio of power of an amplified optical signal to power of the unamplified optical signal.

Power of an amplified optical signal of each wavelength is output signal power of the optical signal of the wavelength, and power of an unamplified optical signal of each wavelength is input signal power of the optical signal of the wavelength. For example, a gain G of each wavelength may be determined using the following formula 3:

$$G(\text{dB}) = 10 \log_{10} \frac{\text{output signal power}}{\text{input signal power}} \quad \text{Formula 3}$$

Figure 4:
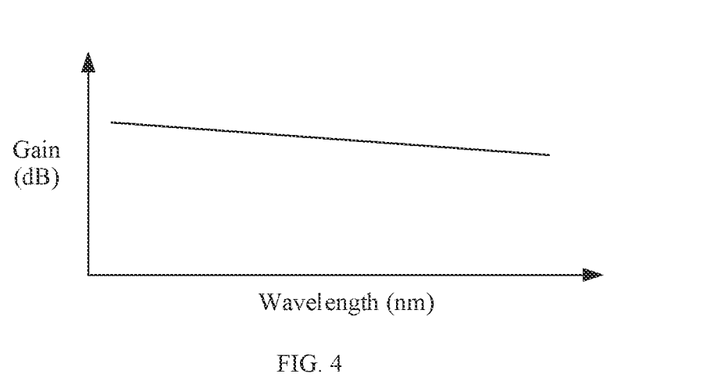
FIG. 4 is a schematic diagram of an ideal gain spectrum according to this application.

It should be noted that, ideally, gains of optical signals that are of all wavelengths and that are transmitted from the egress port of the fiber are the same. FIG. 4 is a schematic diagram of an ideal gain spectrum according to this application. In FIG. 4, after the gain equalization unit of the fiber equalizes gains of optical signals of all wavelengths, gains of the optical signals that are of all the wavelengths and that are transmitted from the egress port of the fiber are the same, that is, the gain spectrum is a straight line. In practice, due to impact of a manufacturing process deviation of a passive component (for example, an ISO and a WDM), there may be some differences between the gains of the optical signals of all the wavelengths in the gain spectrum. However, the gains of the optical signals of all the wavelengths all fall within a preset range, and the preset range may be ±1 dB.

Based on the foregoing fiber, the rare earth-doped core may separately amplify optical signals of all wavelengths. When amplified optical signals pass through the gain equalization unit on the core, the gain equalization unit may equalize (or referred to as flatten) gains of the optical signals of all the wavelengths. In this way, no new component needs to be introduced to equalize gains of optical signals of all wavelengths, such that gain equalization can be implemented without increasing noise. Further, the gain equalization unit is disposed on the rare earth-doped core, such that the gains of the optical signals of all the wavelengths can be equalized while the optical signals of all the wavelengths are amplified. In other words, the gain equalization unit is disposed on the rare earth-doped core, such that the gain equalization unit synchronously equalizes the gains of the optical signals of all the wavelengths while a gain is provided to the core.

The following separately describes the structures shown in FIG. 3, to provide an example implementation solution.

I. Rare Earth-Doped Core

In this application, the rare earth-doped core is configured to separately amplify optical signals of all wavelengths in a received multiplexing wave. Further, optionally, gains corresponding to the optical signals of all the wavelengths may be obtained through design based on an intrinsic parameter of the rare earth-doped core, to determine a gain spectrum for all the wavelengths. For example, the rare earth-doped core is an erbium ion-doped core. For a gain spectrum of the erbium ion-doped core, refer to FIG. 1B.

It should be noted that rare earth doped in the core may be a thulium ion, a neodymium ion, or the like. This is not limited in this application.

II. Cladding

The cladding is a layer of glass or another transparent material that is covered on the outside of the core, and the refractive index of the cladding is less than the refractive index of the rare earth-doped core, such that transmission of an optical signal can be limited in the core.

In a possible implementation, the cladding may include an inner cladding and an outer cladding. A ring-shaped structure tightly wrapping the core is referred to as the inner cladding, and an outermost ring-shaped structure is referred to as the outer cladding. A gully layer (also referred to as a subsidence layer) may be further included between the inner cladding and the outer cladding.

III. Gain Equalization Unit

Figure 5A:
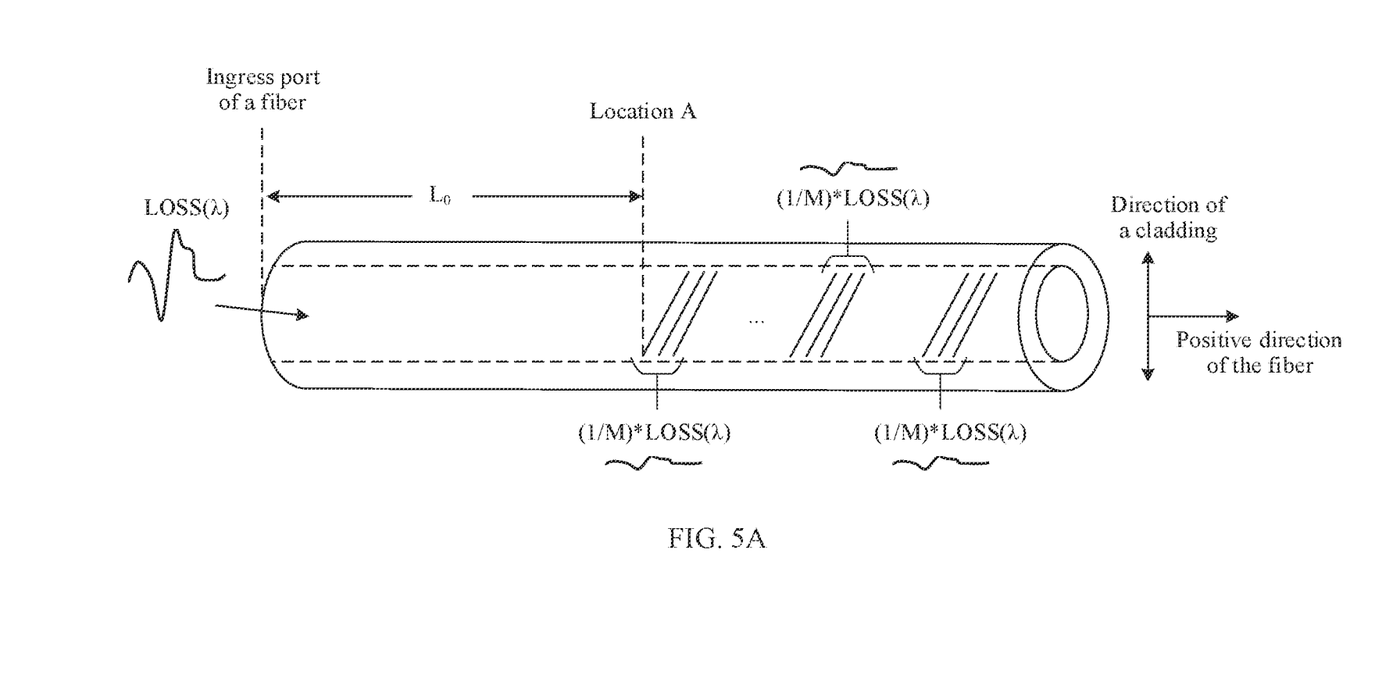
FIG. 5A is a schematic diagram of location distribution of a gain equalization unit on a core according to this application.

In this application, an NF of the optical amplifier using the fiber is greatly affected by an NF 1 of a first stage of amplification structure (with reference to the formula 1). Therefore, it is important to determine a start location of the gain equalization unit on the rare earth-doped core. The start location is a location at which the gain equalization unit is disposed from an ingress port of the fiber. As shown in FIG. 5A, a location A is the start location of the gain equalization unit on the rare earth-doped core, and a distance between the start location of the gain equalization unit and the ingress port of the fiber is represented by $L_0$.

In a possible implementation, the start location of the gain equalization unit on the rare earth-doped core may be determined based on an absorption coefficient (or referred to as an absorption capability) and a preset total absorption amount that correspond to a maximum absorption peak in an absorption spectrum of the rare earth-doped core, where the preset total absorption amount is a total absorption amount at a wavelength corresponding to the maximum absorption peak. This may also be understood as that when the gain equalization unit is disposed at a start location of the rare earth-doped core, the optical amplifier using the fiber has a better noise clamping effect.

Figure 5B:
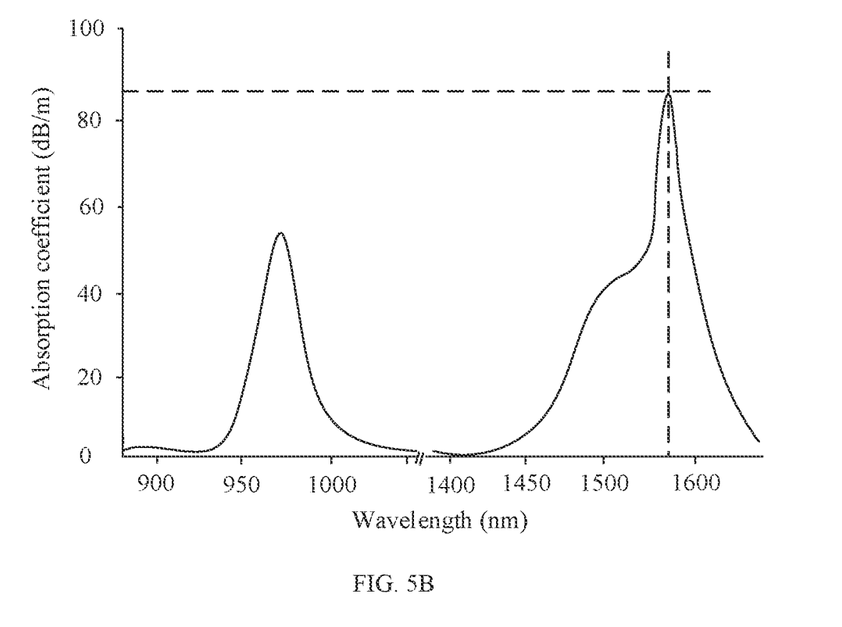
FIG. 5B is a schematic diagram of an absorption spectrum of an erbium doped core according to this application.

An erbium ion-doped core is used as an example below for description. FIG. 5B is a schematic diagram of an absorption spectrum of an erbium doped core according to this application, A maximum absorption peak is at 1530 nm in the absorption spectrum of the core, an absorption coefficient corresponding to the maximum absorption peak is about 85 dB/m, and a preset total absorption amount at the maximum absorption peak is about 40 dB to 90 dB. Therefore, the start location of the gain equalization unit on the rare earth-doped core is equal to the preset total absorption amount at the maximum absorption peak/the absorption coefficient corresponding to the maximum absorption peak. To be more specific, the gain equalization unit may be disposed from a location at a distance of about 0.47 m to 1.06 m away from the ingress port of the core, that is, $L_0$ is about 0.47 m to 1.06 m.

In a possible implementation, the gain equalization unit may include M long period fiber gratings (long period fiber grating, LPFG), where M is an integer greater than or equal to 1. The long period fiber grating is a fiber grating whose period is greater than 1 μm. This may also be understood as that a combination of the M long period fiber grating is the gain equalization unit in this application, and a feature of the gain equalization unit is opposite to a gain of an EDFA.

In a possible implementation, M long period fiber gratings may be etched on the rare earth-doped core using an etching technology of a long period fiber grating. For example, a carbon dioxide (CC)) laser or a femtosecond laser may be used to etch M long period fiber gratings on the core from the determined start location.

Figure 6A:
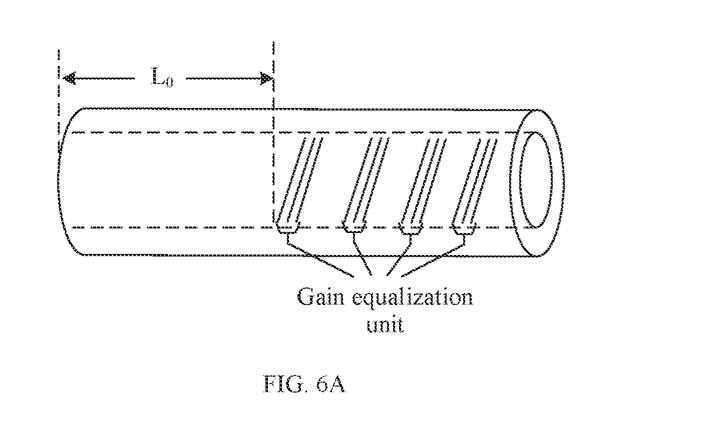
FIG. 6A is a schematic diagram of distribution of M long period fiber gratings on a core according to this application.

When M is greater than 1, the M long period fiber gratings may be dispersedly, distributed on the rare earth-doped core from the start location. The M long period fiber gratings may be evenly distributed on the core or may be unevenly distributed on the core. FIG. 6A is a schematic diagram of distribution of M long period fiber gratings on a core according to this application. In FIG. 6A, M=4 is used as an example. The four long period fiber gratings are evenly, distributed on the rare earth-doped core from the start location.

Figure 6B:
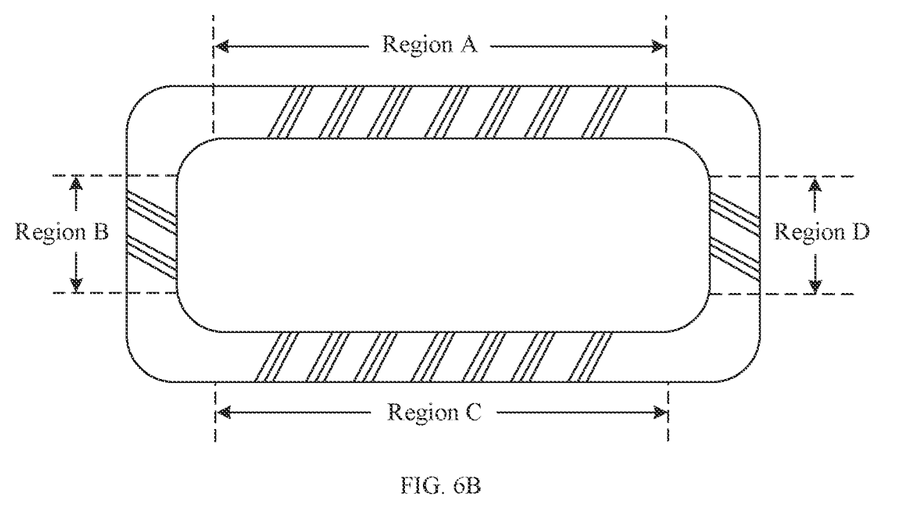
FIG. 6B is another schematic diagram of distribution of M long period fiber gratings on a core according to this application.

FIG. 6B is another schematic diagram of distribution of M long period fiber gratings on a core according to this application. The fiber is a ring-shaped fiber, and the long period fiber grating may be located in a non-bent region. For example, the M long period fiber gratings may be disposed in any one or more of a region A, a region B, a region C, and a region D. Further, optionally, when the non-bent region is relatively small, a distance between two adjacent long period fiber gratings may be relatively small. For example, if the region B and the region D are relatively small, a distance between two adjacent long period fiber gratings in long period fiber gratings disposed in the region B and the region D is relatively small. When the non-bent region is relatively long, a distance between two adjacent long period fiber gratings may be relatively large. For example, a distance between two adjacent long period fiber gratings in long period fiber gratings disposed in the region A and the region C may be relatively large. It should be noted that, in the region A, the region B, the region C, and the region D, distances between two adjacent long period fiber gratings may also be equal (FIG. 6B shows an example in which the long period fiber gratings are evenly distributed in all the regions, and distances between two adjacent long period fiber gratings are the same in the four regions). This is not limited in this application.

In this application, the gain equalization unit may be configured to perform, based on a total attenuation function of the fiber, energy attenuation on an optical signal corresponding to a gain that is greater than a threshold in the gains of the optical signals of all the wavelengths. The threshold may be a minimum gain value in an intrinsic gain spectrum of the rare earth-doped core, or may be any specified value. In this application, the gain equalization unit equalizes a gain spectrum of the fiber by attenuating light energy of a wavelength with a large gain, and skipping attenuating light energy of a wavelength with a small gain, to achieve a gain equalization effect. Alternatively, this may be understood as that a principle of performing gain equalization by the gain equalization unit is separating optical signals of all wavelengths to separately perform different attenuation on optical signals of different wavelengths, such that an optical signal of a wavelength with a large gain corresponds to large attenuated energy.

Figure 7:
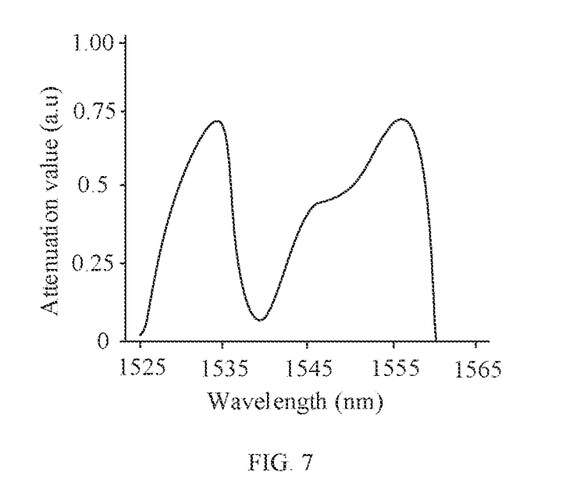
FIG. 7 is a schematic diagram of an attenuation curve of a fiber according to this application.

The total attenuation function of the fiber may be obtained through simulation or test. FIG. 7 is a schematic diagram of an attenuation curve of a fiber according to this application. The attenuation curve of the fiber is obtained through design based on the gain spectrum in FIG. 113, and may represent a distribution relationship between different wavelengths and attenuated energy. It may be learned from FIG. 7 that attenuated energy of wavelengths of 1530 nm and 1555 nm is relatively high. After optical signals whose wavelengths are 1530 nm and 1555 nm pass through an optical amplifier using the fiber, relatively large energy is attenuated, to equalize gains of optical signals of all wavelengths.

In a possible implementation, an attenuation function of each of the M long period fiber gratings is the same as the total attenuation function of the fiber, and a sum of attenuation amplitudes of the M long period fiber gratings is equal to an amplitude of the total attenuation function of the fiber.

The following illustrates two implementations in which the sum of the attenuation amplitudes of the M long period fiber gratings is equal to the amplitude of the total attenuation function of the fiber.

Implementation 1: An attenuation amplitude of each of the M long period fiber gratings is equal to the amplitude of the total attenuation function of the fiber/M.

Figure 8:
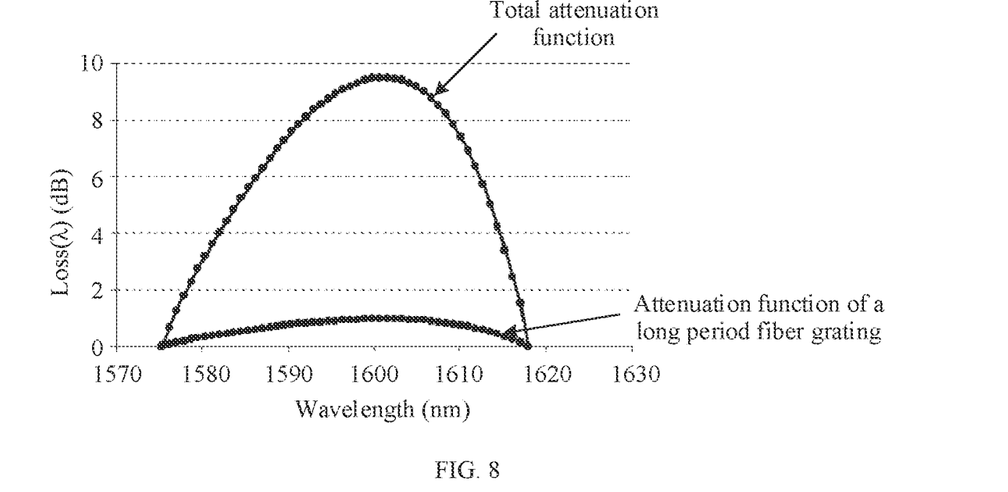
FIG. 8 is a schematic diagram of a relationship between a total attenuation function and an attenuation function of a long period fiber grating according to this application.

This may also be understood as that the amplitude of the total attenuation function of the fiber is evenly divided into M parts, and reference may be made to FIG. 8 that shows a schematic diagram of a relationship between a total attenuation function and an attenuation function of a long period fiber grating, and between an amplitude of the total attenuation function and an attenuation amplitude of the long period fiber grating. Further, with reference to FIG. 5A, if the total attenuation function of the fiber is $Loss(\lambda)$ the attenuation function of each of the M long period fiber gratings is also $Loss(\lambda)$, and the attenuation amplitude of each long period fiber grating is 1/M.

Implementation 2: An attenuation amplitude of each of the M long period fiber gratings is equal to a result of the amplitude of the total attenuation function*a value less than 1, that is, the amplitude of the total attenuation function is divided into M parts based on a specific proportion.

For example, M=4. The amplitude of the total attenuation function may be divided into 1:2:4:1. An attenuation function for the four long period fiber gratings is the same as the total attenuation function of the fiber. An amplitude of a first long period fiber grating is the amplitude of the total attenuation function*1/8, an amplitude of a second-long period fiber grating is the amplitude of the total attenuation function*2/8, an amplitude of a third long period fiber grating is the amplitude of the total attenuation function*4/8, and an amplitude of a fourth long period fiber grating is the amplitude of the total attenuation function*1/8.

The total attenuation function may be divided into M parts using the M long period fiber gratings, and the M parts are dispersedly distributed in a specific length of the rare earth-doped core, to form the gain equalization unit in this application, thereby dispersedly flattening a gain of the optical amplifier using the fiber.

Further, optionally, to prevent an amplified optical signal from being reflected to a region before the start location of the core, the gain equalization unit also has a requirement for a dissipation direction of attenuated energy. In a possible implementation, the gain equalization unit may be configured to radiate (or referred to as dissipate) the attenuated energy to a cladding direction (refer to NG. 5A), and a remaining optical signal is transmitted in a positive direction (that is, a direction perpendicular to the cladding) of the fiber. For example, the energy attenuation may be radiated to the cladding direction using an inclined long period fiber grating. In other words, the gain equalization unit may be M inclined long period fiber gratings.

Based on the structure and the function principle of the fiber described above, this application may further provide an optical amplifier. The optical amplifier may include at least one stage of amplification structure, and each stage of amplification structure in the at least one stage of amplification structure includes the foregoing fiber, a multiplexer, a first optical selector, a pump source, and a second optical selector. The fiber may be an erbium doped fiber (EDF), and the EDF is a main body of the optical amplifier. The first optical selector is configured to receive optical signals of all wavelengths, and transmit the optical signals of all the wavelengths to the multiplexer. The pump source is configured to transmit pumped light, that is, configured to provide energy to the EDF, and mainly configured to provide energy to an erbium ion in the EDF, such that the erbium ion makes a transition from a ground state to a metastable state after absorbing the energy. The multiplexer may also be referred to as a wavelength division multiplexer, and is configured to combine the pumped light and the received optical signals of all the wavelengths into one multiplexing wave, and couple the multiplexing wave to the fiber. The second optical selector is configured to output amplified and gain-equalized optical signals that are of all the wavelengths and that are from the fiber. Certainly, the optical amplifier may further include another component. This is not limited in this application. In other words, the fiber provided in the foregoing embodiment can be used in any apparatus that has an optical amplification function.

In this application, the first optical selector and the second optical selector are further configured to isolate reverse propagation of amplified optical signals. This may also be understood as that the first optical selector may be further configured to isolate reverse propagation of optical signals amplified due to spontaneous emission of the fiber. The second optical selector may be configured to output the amplified and gain-equalized optical signals of all the wavelengths, and may be further configured to prevent reverse reflection of an optical signal in a next span. Further, optionally, the first optical selector and the second optical selector may be further configured to isolate noise.

In a possible implementation, the first optical selector and the second optical selector each may be an optical isolator (Isolator), and the optical isolator is a unidirectional optical transmission component, such that back and forth reflection of light can be suppressed, thereby ensuring stable working of the optical amplifier.

Figure 9:
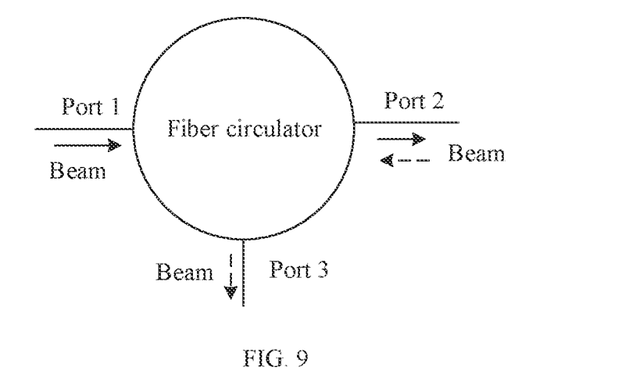
FIG. 9 is a schematic diagram of a structure of a fiber circulator according to this application.

In another possible implementation, the first optical selector and the second optical selector each may be a fiber circulator. The fiber circulator is a multi-port non-reciprocal optical component, and light can be propagated in only one direction. FIG. 9 is a schematic diagram of a structure of a fiber circulator according to this application. If light is input from a port 1, the light is output from a port 2; or if light is input from the port 2, the light is output from a port 3. Output losses of the light both are very small. When light is input from the port 2 and output from the port 1, a loss is very large. Similarly, when light is input from the port 3 and output from the port 1 or the port 2, a loss is very large.

Figure 10A:
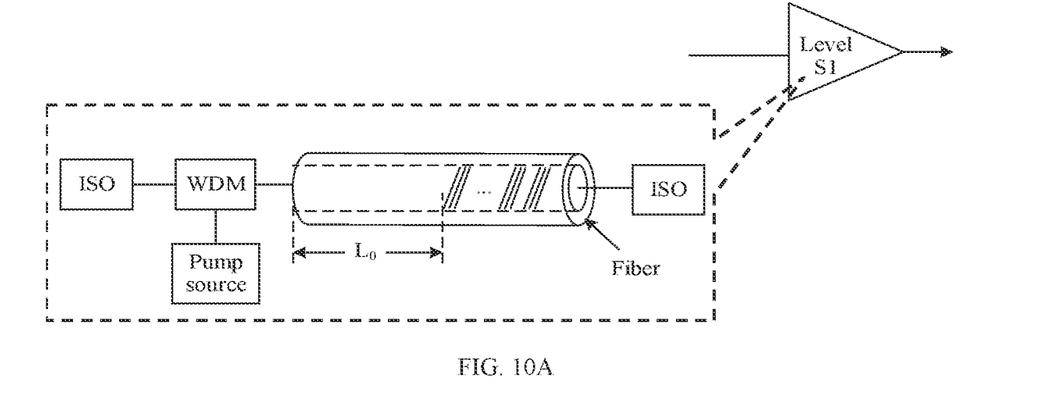
FIG. 10A is a schematic diagram of a structure of an optical amplifier according to this application.

FIG. 10A is a schematic diagram of a structure of an optical amplifier according to this application. The optical amplifier includes one stage of amplification structure. The amplification structure includes the foregoing fiber, a multiplexer; a first optical selector, a pump source, and a second optical selector. For example, the first optical selector and the second optical selector are optical isolators. For functions and principles of the structures, refer to the foregoing related described content. Details are not described herein again.

Figure 10B:
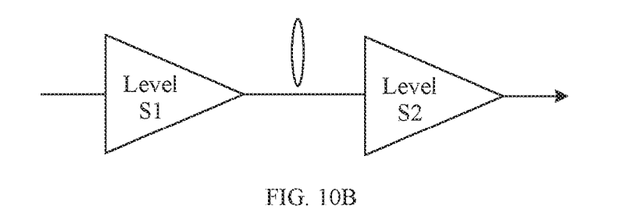
FIG. 10B is a schematic diagram of a structure of another optical amplifier according to this application.

FIG. 10B is a schematic diagram of a structure of another optical amplifier according to this application. For example, a structure of the optical amplifier includes two stages of amplification structures, that is, the optical amplifier includes an S1 amplification structure and an S2 amplification structure. The S1 amplification structure and the S2 amplification structure may be connected using an optical waveguide, and the optical waveguide includes but is not limited to a fiber. For descriptions of functions and principles of structures in the S1 amplification structure and the S2 amplification structure, refer to the foregoing described content.

It should be noted that a quantity of long period fiber gratings included in the S amplification structure may be the same as or different from a quantity of long period fiber gratings included in the S2 amplification structure. This is not limited in this application. In addition, "at least one stage" means one or more stages, and "a plurality of stages" means two or more stages.

Based on the optical amplifier, the rare earth-doped core may separately amplify optical signals of all wavelengths. When amplified optical signals pass through the gain equalization unit, the gain equalization unit may equalize (also referred to as flatten) gains of the optical signals of all the wavelengths. In this way, no new component needs to be introduced into the optical amplifier to equalize gains of optical signals of all wavelengths, such that gains of amplified optical signals of all the wavelengths can be equalized without increasing noise of the optical amplifier. To be more specific, when noise of the optical amplifier is relatively low, a relatively large quantity of stages of amplification structures may be concatenated in the optical amplifier, to implement a relatively large amplification function.

When the optical amplifier shown in FIG. 10A or FIG. 10B is used, a gain spectrum with a flat gain can be obtained, and noise of the optical amplifier is relatively low. For example, the optical amplifier shown in FIG. 10A is an EDFA, the gain equalization unit includes 10 long period fiber gratings, and a preset total absorption amount is 50 dB. A start location of the long period fiber grating on the rare earth-doped core may be determined based on the preset total absorption amount, and an absorption coefficient and a preset total absorption amount that correspond to a maximum absorption peak in an absorption spectrum of the EDFA, that is, $L_0≈0.6$ m. A gain distribution relationship (as shown in FIG. HA) between different wavelengths and a distribution relationship (as shown in FIG. 11B) between noise of different wavelengths may be obtained through simulation.

Figure 11A:
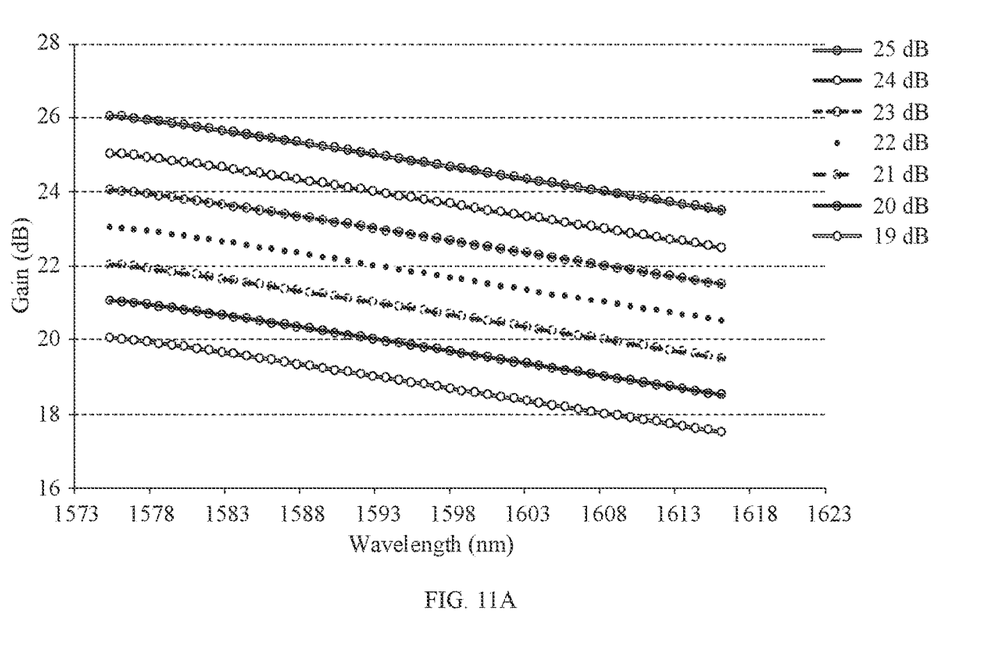
FIG. 11A is a schematic diagram of a relationship between different wavelengths and gains according to this application.
Figure 11B:
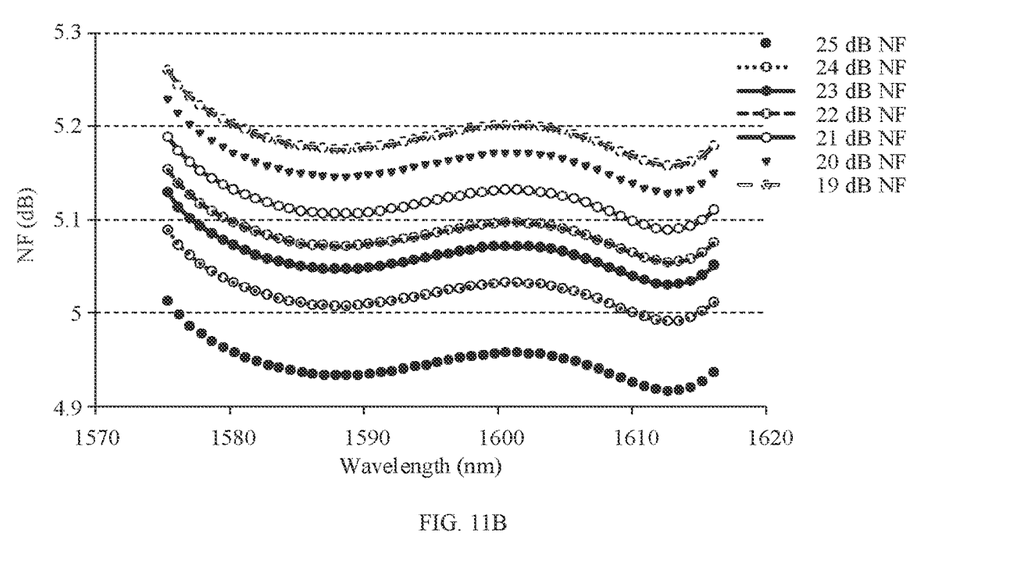
FIG. 11B is a schematic diagram of a relationship between different wavelengths and noise according to this application.

It may be learned from FIG. 11A that the EDFA in this application can equalize gains of optical signals of all wavelengths. It may be learned from FIG. 1113 that, when a gain of the EDFA decreases from 25 dB to 19 dB, an NF increases by about 0.25 dB. Therefore, when the optical amplifier in this application is used, gains of optical signals of all wavelengths can be flattened without increasing noise.

Figure 12:
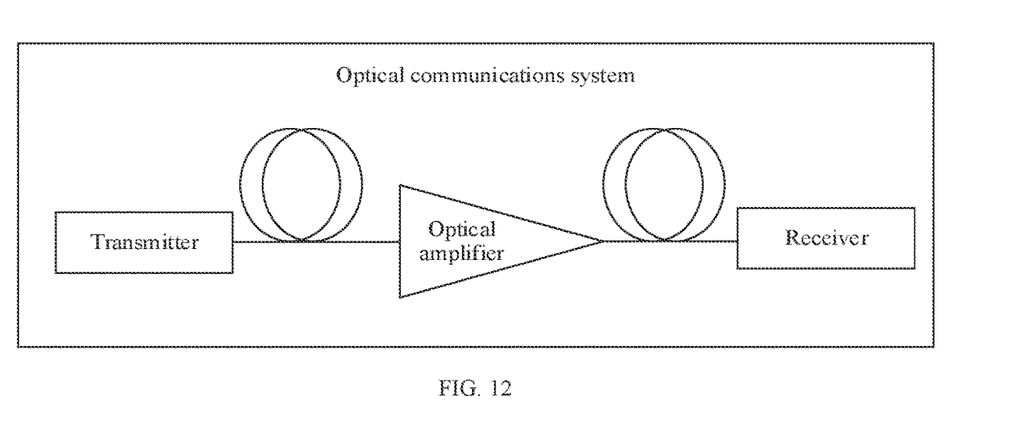
FIG. 12 is a schematic diagram of an architecture of an optical communications system according to this application.

Based on the structure and the function principle of the optical amplifier described above, this application may further provide an optical communications system. FIG. 12 is a schematic diagram of an architecture of an optical communications system according to this application. The optical communications system may include an optical amplifier, a transmitter, and a receiver. The transmitter is configured to transmit optical signals of all wavelengths to the optical amplifier. The receiver is configured to receive amplified and gain-equalized optical signals that are of all the wavelengths and that are output from the optical amplifier; and convert, into electrical signals, the amplified and gain-equalized optical signals of all the wavelengths. For a function and a possible implementation of the optical amplifier, refer to the foregoing related description. Details are not described herein again.

It should be noted that, in the optical communications system, two or more optical amplifiers may be included between the transmitter and the receiver. FIG. 12 is described using only one optical amplifier as an example.

In a possible implementation, the transmitter may include a light source, and the light source may be configured to transmit optical signals of different wavelengths. For example, the light source may be a laser, and the laser may transmit an optical signal whose wavelength range is between a C band and an L band.

In this application, the optical amplifier may be used as a pre-amplifier, a line-amplifier, or a power-amplifier in a WDM communications system. When the optical amplifier is used as a pre-amplifier, a very small noise figure is required, no excessively large requirement is imposed for output power, and signal input power is about −40 dBm. When the optical amplifier is used as a line-amplifier, the optical amplifier may be directly inserted into a fiber transmission link to be used as an optical relay amplifier, such that an optical/electrical/optical conversion process of an electrical repeater is omitted, and an optical signal is directly amplified, to compensate for a transmission line loss and prolong a relay distance. Therefore, a relatively small noise figure and relatively large output light power are usually required. When the optical amplifier is used as a power-amplifier, a requirement for a noise figure and a gain is not high, but it is required that an amplified optical signal has relatively large output power.

In the embodiments of this application, if no special description or logic conflict exists, terms and/or descriptions of different embodiments are consistent and may be mutually referenced, and technical features in different embodiments may be combined to form a new embodiment based on an internal logical relationship of the different embodiments.

It may be understood that various numeric numbers in this application are only descriptions for convenient differentiation, and are not used to limit the scope of the embodiments of this application. Sequence numbers of the foregoing processes do not mean an execution sequence, and the execution sequence of the processes should be determined based on functions and internal logic of the processes. Terms "first" and "second" are used to distinguish between similar objects, and do not need to be used to describe a specific order or sequence. In addition, the terms "include" and "have", and modification thereof are intended to cover non-inclusive inclusion, for example, including a series of steps or units. The methods, systems, products, or devices are not necessarily limited to those steps or units that are clearly listed, but may include other steps or units that are not clearly listed or are inherent to these processes, methods, products, or devices.

Although this application is described with reference to example features and embodiments thereof, it is clear that various modifications and combinations may be made to them without departing from the spirit and scope of this application. Correspondingly, the specification and accompanying drawings are only example descriptions of this application defined by the appended claims, and are considered as any of or all modifications, variations, combinations or equivalents that cover the scope of this application.

It is clear that a person skilled in the art can make various modifications and variations to this application without departing from the spirit and scope of the present disclosure. This application is intended to cover these modifications and variations provided that they fall within the scope of protection defined by the following claims and their equivalent technologies.

What is claimed is:

1. A fiber comprising:
a rare earth-doped core configured to separately amplify optical signals of all wavelengths in a received multiplexing wave;
a cladding having a first refractive index that is less than a second refractive index of the rare earth-doped core, wherein the cladding and the rare earth-doped core are sequentially distributed from inside to outside of the fiber;
a gain equalizer disposed on the rare earth-doped core and configured to equalize gains of the optical signals of all the wavelengths to generate equalized gains, wherein the equalized gains all fall within a preset range, wherein a start location of the gain equalizer is based on an absorption coefficient and a preset total absorption amount that correspond to a maximum absorption peak in an absorption spectrum of the rare earth-doped core, and wherein gain of each of the optical signals is based on a ratio of power of an amplified optical signal to a power of an unamplified optical signal; and
an egress port configured to transmit the optical signals.

2. The fiber of claim 1, wherein the gain equalizer is further configured to perform, based on a total attenuation function of the fiber, energy attenuation on an optical signal corresponding to a gain that is greater than a threshold in the gains of the optical signals of all the wavelengths.

3. The fiber of claim 2, wherein the gain equalizer is further configured to radiate attenuated energy to a direction of the cladding.

4. The fiber of claim 1, wherein the gain equalizer comprises M long period fiber gratings, and wherein M is an integer greater than or equal to 1.

5. The fiber of claim 4, wherein when M is greater than 1, the M long period fiber gratings are dispersedly distributed on the rare earth-doped core from the start location of the gain equalizer.

6. The fiber of claim 4, wherein an attenuation function of each of the M long period fiber gratings is the same as a total attenuation function of the fiber, and wherein a sum of attenuation amplitudes of the M long period fiber gratings is equal to an amplitude of the total attenuation function.

7. An optical amplifier, comprising:
at least one stage of an amplification structure comprising:
a fiber comprising a rare earth-doped core and a cladding that are sequentially distributed from inside to outside, wherein a first refractive index of the cladding is less than a second refractive index of the rare earth-doped core, wherein the rare earth-doped core comprises a gain equalizer, wherein the rare earth-doped core is configured to separately amplify optical signals of all wavelengths in a received multiplexing wave, wherein the gain equalizer is configured to equalize gains of the optical signals of all the wavelengths to generate equalized gains of optical signals that are of all the wavelengths and that are transmitted from an egress port of the fiber, wherein the equalized gains all fall within a preset range, wherein a start location of the gain equalizer on the rare earth-doped core is based on an absorption coefficient and a preset total absorption amount that correspond to a maximum absorption peak in an absorption spectrum of the rare earth-doped core, and wherein gain of each optical signal of each wavelength in the optical signals is determined based on a ratio of power of an amplified optical signal to power of an unamplified optical signal,
a first optical selector configured to receive and transmit optical signals of all wavelengths;
a pump source configured to emit pumped light;
a multiplexer configured to:
receive the optical signals from the first optical selector and the pumped light from the pump source;
combine the pumped light and the optical signals into one multiplexing wave; and
couple the one multiplexing wave to the fiber; and
a second optical selector configured to output, from the fiber, amplified and gain-equalized optical signals that are of all the wavelengths.

8. The optical amplifier of claim 7, wherein the gain equalizer is configured to perform, based on a total attenuation function of the fiber, energy attenuation on an optical signal corresponding to a gain that is greater than a threshold in the gains of the optical signals of all the wavelengths.

9. The optical amplifier of claim 8, wherein the gain equalizer is further configured to radiate attenuated energy to a direction of the cladding.

10. The optical amplifier of claim 7, wherein the gain equalizer comprises M long period fiber gratings, and wherein M is an integer greater than or equal to 1.

11. The optical amplifier of claim 10, wherein when M is greater than 1, the M long period fiber gratings are dispersedly distributed on the rare earth-doped core from the start location of the gain equalizer.

12. The optical amplifier of claim 10, wherein an attenuation function of each of the M long period fiber gratings is the same as a total attenuation function of the fiber, and wherein a sum of attenuation amplitudes of the M long period fiber gratings is equal to an amplitude of the total attenuation function.

13. The optical amplifier of claim 7, wherein the first optical selector and the second optical selector are further configured to isolate reverse propagation of the amplified and gain-equalized optical signals.

14. An optical communications system, comprising:
an optical amplifier comprising at least one stage of an amplification structure, wherein the amplification structure comprises:
a fiber having a rare earth-doped core and a cladding that are sequentially distributed from inside to outside, wherein a first refractive index of the cladding is less than a second refractive index of the rare earth-doped core, wherein the rare earth-doped core comprises a gain equalizer, wherein the rare earth-doped core is configured to separately amplify optical signals of all wavelengths in a received multiplexing wave, wherein the gain equalizer is configured to equalize gains of the optical signals of all the wavelengths to generate equalized gains of optical signals that are of all the wavelengths and that are transmitted from an egress port of the fiber, wherein the equalized gains all fall within a preset range, wherein a start location of the gain equalizer on the rare earth-doped core is based on an absorption coefficient and a preset total absorption amount that correspond to a maximum absorption peak in an absorption spectrum of the rare earth-doped core, and wherein gain of each optical signal of each wavelength in the optical signals is determined based on a ratio of power of an amplified optical signal to power of an unamplified optical signal;

a first optical selector configured to receive and transmit optical signals of all wavelengths;
a pump source configured to emit pumped light;
a multiplexer configured to:
 receive the optical signals from the first optical selector and the pumped light from the pump source;
 combine the pumped light and the optical signals into one multiplexing wave; and
 couple the one multiplexing wave to the fiber; and
a second optical selector configured to output, from the fiber, amplified and gain-equalized optical signals that are of all the wavelengths;
a transmitter configured to transmit optical signals of all wavelengths to the optical amplifier; and
a receiver configured to receive, from the optical amplifier, amplified and gain-equalized optical signals of all the wavelengths, and convert the amplified and gain-equalized optical signals into electrical signals.

15. The optical communications system of claim 14, wherein the gain equalizer is configured to perform, based on a total attenuation function of the fiber, energy attenuation on an optical signal corresponding to a gain that is greater than a threshold in the gains of the optical signals of all the wavelengths.

16. The optical communications system of claim 15, wherein the gain equalizer is further configured to radiate attenuated energy to a direction of the cladding.

17. The optical communications system of claim 14, wherein the gain equalizer comprises M long period fiber gratings, and wherein M is an integer greater than or equal to 1.

18. The optical communications system of claim 17, wherein when M is greater than 1, the M long period fiber gratings are dispersedly distributed on the rare earth-doped core from the start location of the gain equalizer.

19. The optical communications system of claim 17, wherein an attenuation function of each of the M long period fiber gratings is the same as a total attenuation function of the fiber, and wherein a sum of attenuation amplitudes of the M long period fiber gratings is equal to an amplitude of the total attenuation function.

20. The optical communication system of claim 14, wherein the first optical selector and the second optical selector are further configured to isolate reverse propagation of the amplified and gain-equalized optical signals.

* * * * *